Jan. 26, 1965  M. D. TUPPER  3,166,828
METHOD FOR MOUNTING BEARINGS IN A DYNAMOELECTRIC MACHINE
Filed Sept. 28, 1961  3 Sheets-Sheet 1
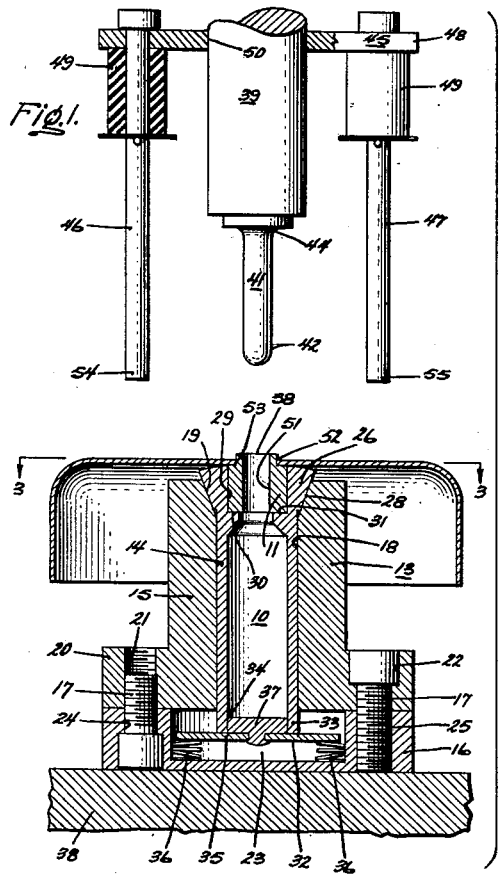
Fig.1.
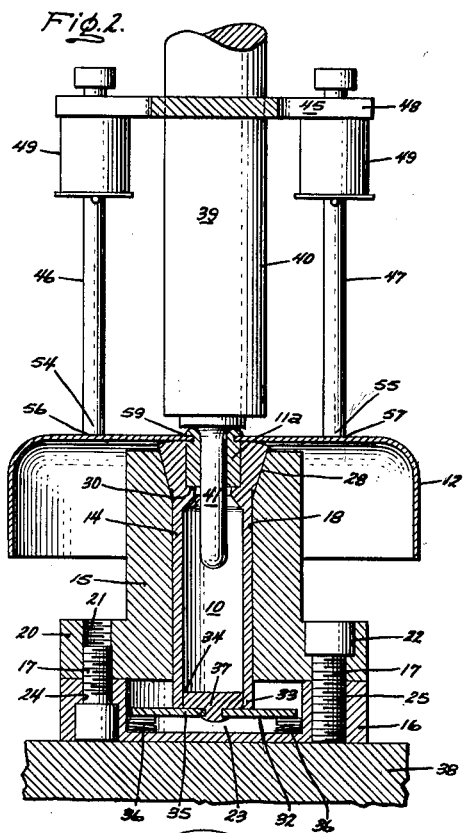
Fig.2.
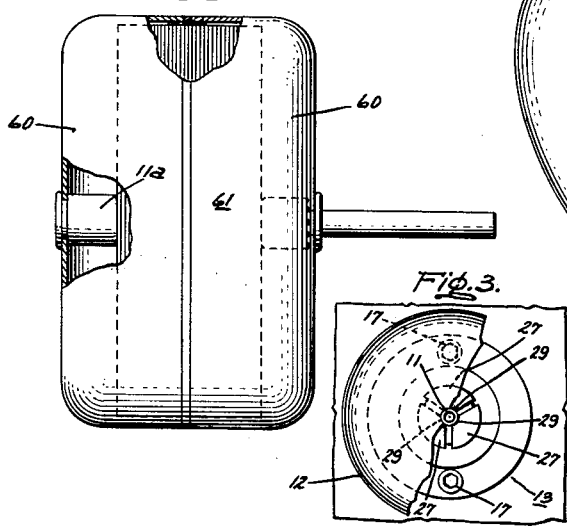
Fig.5.
Fig.3.
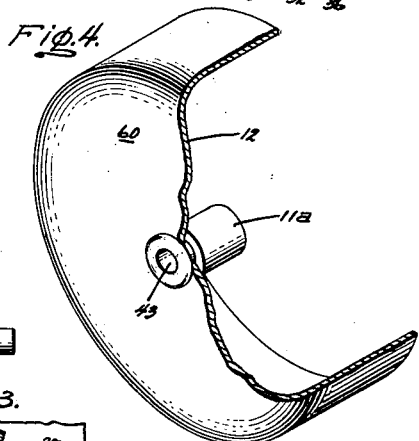
Fig.4.
Inventor:
Myron D. Tupper,
by H. F. Manbeck, Jr.
Attorney.

Jan. 26, 1965   M. D. TUPPER   3,166,828
METHOD FOR MOUNTING BEARINGS IN A DYNAMOELECTRIC MACHINE
Filed Sept. 28, 1961   3 Sheets-Sheet 2
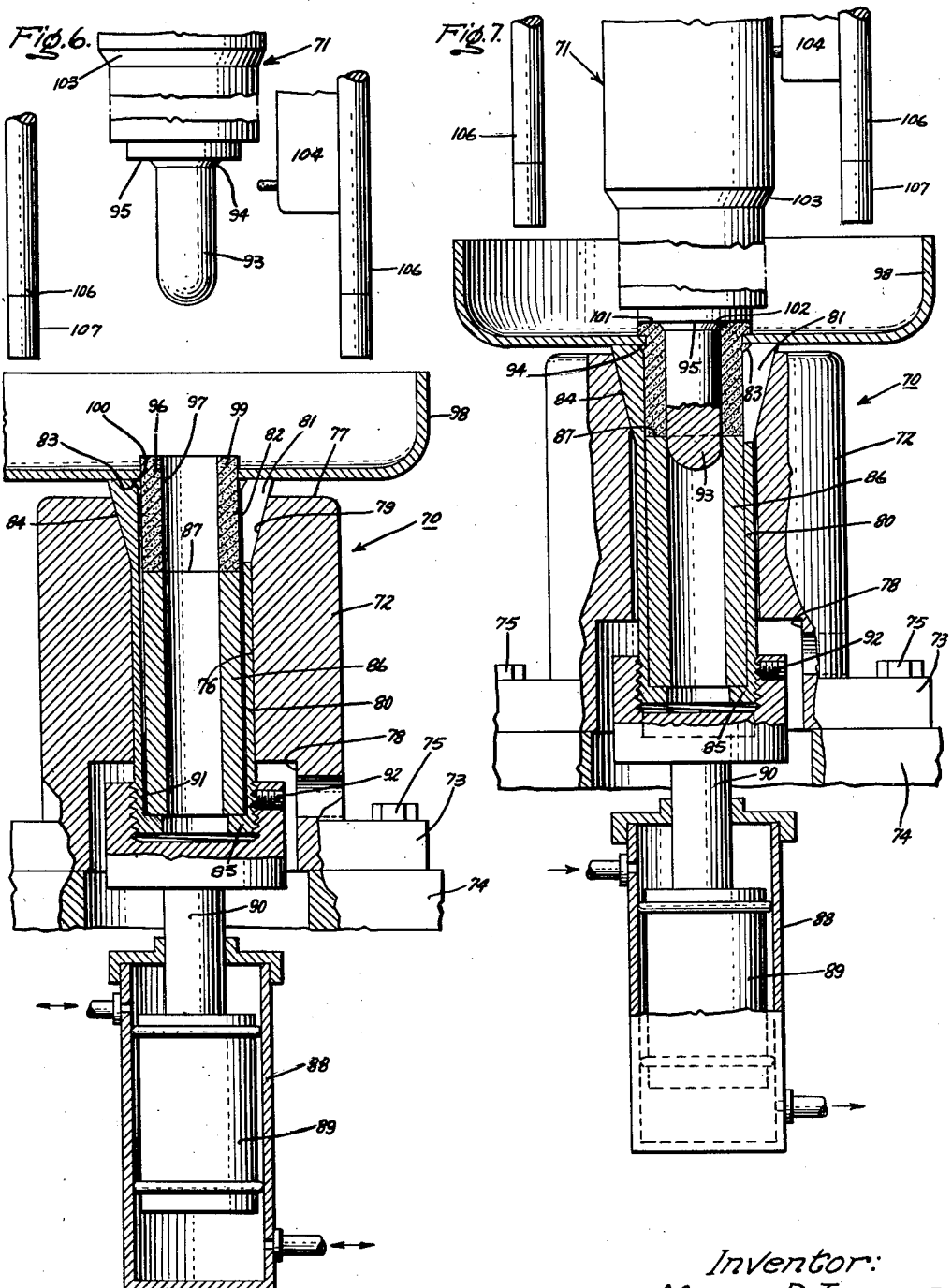
Inventor:
Myron D. Tupper,
by H. F. Manbeck Jr.
Attorney.

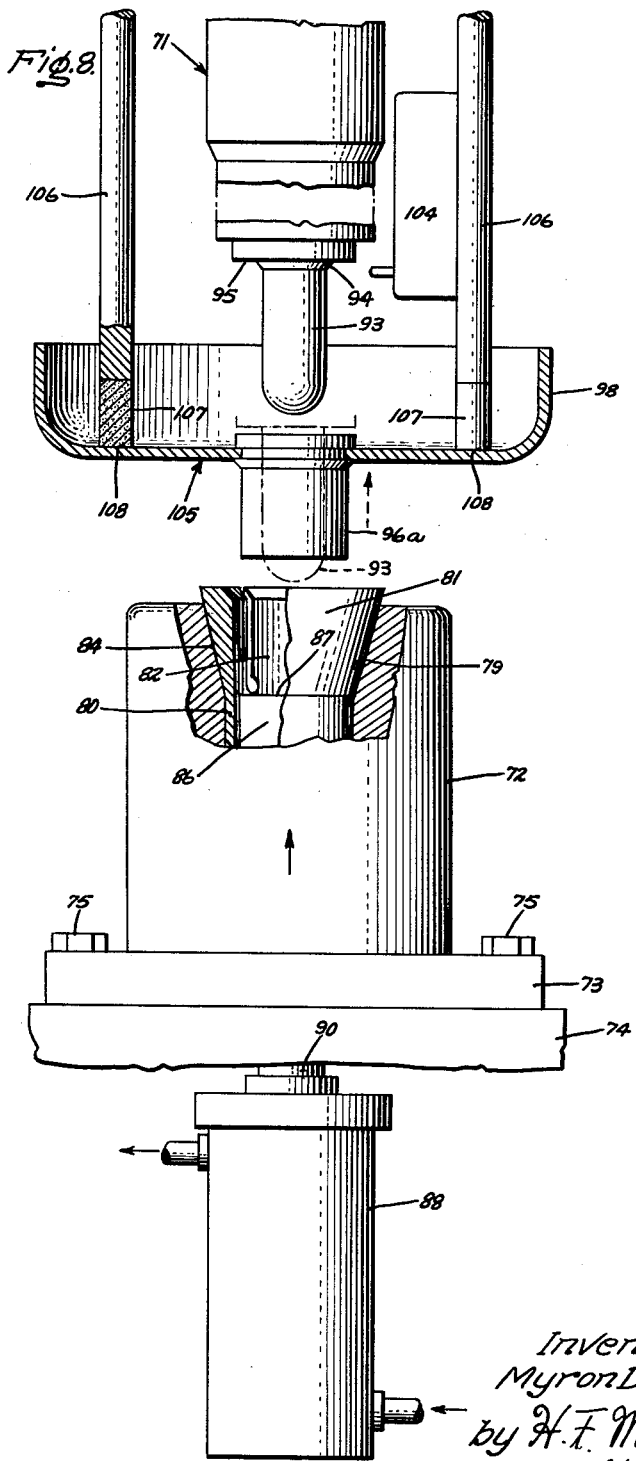

United States Patent Office 3,166,828
Patented Jan. 26, 1965

3,166,828
METHOD FOR MOUNTING BEARINGS IN A
DYNAMOELECTRIC MACHINE
Myron D. Tupper, Fort Wayne, Ind., assignor to General
Electric Company, a corporation of New York
Filed Sept. 28, 1961, Ser. No. 142,455
10 Claims. (Cl. 29—149.5)

The present invention relates to dynamoelectric machines, and more particularly, to an improved method for mounting bearings in the same. This application is a continuation-in-part of my co-pending application Serial No. 72,822, filed November 30, 1960, now abandoned, for the Apparatus and Method for Mounting Bearings in a Dynamoelectric Machine, which in turn is a continuation-in-part of my application Serial No. 772,276, filed November 6, 1958, now abandoned.

One common form of machine is the small and fractional horsepower induction motor type having a stator, a rotatable member or rotor, and a pair of end shield assemblies for rotatably supporting the rotor. The rotor is secured to a shaft, which is rotatably carried by a pair of bearings, one provided in each end shield assembly. As is well known in the dynamoelectric machine art, one important factor which directly affects machine performance; i.e., motor efficiency and premature bearing failures, is the degree of intereference experienced by the revolving rotor shaft with the shaft carrying bearings. The interference is determined, to a great extent, by the alignment and journal friction of the rotor shaft with the bearings. Proper rotation of the shaft is especially significant in the operation of high speed motors.

One common end shield construction generally employed in fractional horsepower motors, is a simple and inexpensive arrangement in which one end of the bearing is directly secured to the end shield, providing the only means of support for the bearing. Although this construction is highly desirable from the standpoint of design and of low cost, previous methods of fastening the end of the bearing to the end shield and the apparatus used for assembly, have limited the degree of alignment and friction free journaling of the shaft and bearings obtained in the finally assembled machine, and therefore have not been wholly satisfactory. For example in one method a bearing, initially formed with a pre-sized accurately dimensioned bore, is finally assembled and secured onto the end shield by a staking process. But during the final assembly steps, the accurately finished bore or journal surface, attained during the prior manufacturing procedures, is to some extent destroyed, often rendered somewhat barrel shaped, and free rotation of the shaft within the bearing is impeded. This distortion may result in premature bearing failure as well as poor motor performance. Moreover, due to the fact that the bearing is secured and supported at only one of its ends in the end shield assembly, the place of securement is subjected to high stresses during motor operation and it has been found that a staked mounting accomplished by such prior art procedures does not always provide a sufficiently strong means for rigidly holding the bearing onto the end shield. The bearing, therefore, has a tendency to become loose during motor operation, thereby causing misalignment of the bearings and shaft.

Thus, it is readily apparent that, although the simple construction, in which the bearing is mounted at its one end directly onto the end shield, is highly desirable for the reasons of cost and simple design, the method of assembly and apparatus used for such assembly have resulted in limitations on the quality of the end shield assembly produced thereby.

Accordingly, it is an object of the present invention to provide an improved method of assemblying a bearing onto a machine end shield, suitable for mass production manufacture, whereby the inner bearing surface dimensions are accurately controlled and the support of the bearing on the end shield has a high degree of strength.

It is a further object of the invention to provide an improved process of manufacture for rigidly mounting a bearing onto a machine end shield whereby the bearing will be fixedly secured to the end shield with a minimum of mounting parts.

Yet another object is the provision of an improved method of forming and finishing a molded sintered sleeve type bearing shile rigidly fastening it onto an end shield member of sheet material whereby the bearing is provided with an accurately dimensioned and smooth journal surface and with a predetermined degree of porosity for accurately controlling the flow of lubricant radially through the bearing for lubricating the journal surface at a prescribed rate.

Further objects and advantages will become apparent as the following description proceeds and the subject matter which I regard as my invention is pointed out with particularity in the claims annexed to and forming a part of this specification.

In carrying out the objects of my invention in one form thereof, I provide an improved method by which a bearing is formed and assembled onto an end shield. In this method I use a bearing blank which has a reduced outer diameter at one of its ends, this end being adapted to be received by an aperture suitably positioned in the end shield. Initially, the bearing blank is placed in a compressible holding fixture and aligned with the end shield and a bearing sizing pin is inserted into the bore. The end of the reduced portion is then riveted to the end shield, rigidly securing the blank thereto, and in addition, the bearing blank is compressed between the holding fixture and the sizing pin to form a finished bearing having an accurately dimensioned bore surface throughout its length. The pin is then removed from the bearing bore and the bearing is released from the holding fixture.

By a further aspect of the present invention, I provide a variation of the afore-described method, especially desirable for the formation of a sintered sleeve type bearing having an axial length to wall thickness ratio of 1.5 or less. I have determined that above this ratio, the bearing blank is extremely sensitive to the procedure employed in its fabrication and may include a frusto-conical shaped journal surface in its final form. Using a porous or permeable sintered powdered bearing blank as an illustration, in one form of the process, axial pressure is applied to one end of the blank, initially securing it to the end shield while the other end of the blank is disposed within the collet recess. Thereafter, this pressure is relieved and the end of the blank within the collet recess is radially compressed with a predetermined force by reducing the cross section of the collet to squeeze the blank inwardly around and in intimate contact with a sizing pin which projects into the blank bore. This squeezing or compression step provides both an accurately dimensioned cylindrical bore and a bearing body having a desired permeability. The radial compression of the bearing body is then discontinued and the pin is removed from the bore, wiping it, to furnish a smooth journal surface.

For a better and more complete understanding of the invention, reference should be had to the following description taken in conjunction with the accompanying drawings which illustrate the preferred embodiments of the present invention.

In the drawings:

FIG. 1 is a partial side view in cross-section of the apparatus in one form thereof with a motor end shield and bearing blank positioned on the fixture assembly, illustrating one step of the improved method of this invention;

FIG. 2 is a similar view to FIG. 1 showing the next assembly step in the improved method of the invention, with the bearing bore being properly sized while the bearing is being fixedly mounted to the end shield;

FIG. 3 is a plan view, broken away in part of the end shield and bearing as positioned on the fixture, shown in FIG. 1, to illustrate more clearly the assembly fixture;

FIG. 4 is a perspective view, broken away in part, of the assembled end shield assembly after its removal from the assembly fixture, to illustrate more clearly the bearing mounting;

FIG. 5 is a side view, broken away in part of a pair of end shield assemblies, assembled by the improved process with use of the novel apparatus of FIG. 1, as finally positioned on an electric motor;

FIG. 6 is a partial side view in cross section showing a second embodiment of the improved apparatus with an unfinished bearing blank and motor end shield in place on the fixture assembly and with the bearing attaching and sizing mechanism and the bearing holding and forming means in their respective raised or unoperated positions;

FIG. 7 is a similar view to FIG. 6 illustrating the bearing attaching and sizing mechanism and the bearing holding and forming means of the apparatus of FIG. 6 in their respective lower or operated positions; and FIG. 8 is a similar view to FIG. 6 showing the formed and finished bearing firmly attached to the motor end shield just prior to the removal of the end shield assembly from the apparatus, with the component parts of the improved apparatus in their raised positions.

Referring now to the drawings in more detail, one form of the improved apparatus is illustrated in FIGS. 1–3 inclusive. As shown therein, fixture assembly or jig, generally indicated at 10, is provided for holding a sleeve type bearing blank 11 (to be described more fully hereinafter) while it is being formed into a finished bearing 11a and assembled onto end shield 12. The fixture 10 comprises a cast housing 13 and a bearing holding sleeve 14 movably mounted therein. Housing 13 consists of two cast members, a hollow cylindrical upper member 15 and base member 16, which are detachably secured together by any suitable means, such as by screw means 17. Upper member 15 is provided with a centrally disposed, longitudinally extending bore 18 having a beveled or inclined wall 19 formed at the upper entrance of the bore 18. The lower portion of member 15 is provided with an annular flange 20 having a pair of apertures or holes 21 and 22, adapted to cooperate with screw means 17. Base member 16, annular in configuration, is provided with a central chamber 23 which communicates with bore 18 of upper member 15. A pair of holes 24 and 25, adapted to receive screw means 17, are disposed in base member 16 in cooperative relation to the respective holes 21 and 22 provided in the flange 20, thus completing the means for securing together the two housing members.

The bearing holding sleeve 14 is slidably received in bore 18 of upper member 15. At its upper end, sleeve 14 is provided with a split collet portion 26, having three spaced apart sections 27, each formed with an outer inclined wall 28 for sliding engagement with wall 19 of bore 18. The inner walls 29 of each section 27 cooperate to define a central recess 30, which is formed with a lower shoulder 31 which is adapted to receive and retain the bearing blank 11. An energy storing device 32, positioned within chamber 23, is fastened to the lower portion 33 of sleeve 14 in any suitable manner, generally indicated at 34, and cooperates with collet portion 26 to form the bearing releasing means in a manner which will become apparent as the description proceeds. As shown, device 32 comprises a central horizontally extending arm 35 to which is fastened a biasing means in the form of a pair of spring members 36, one being secured at each end of arm 35. Further, the arm is attached, as by riveting, to a cap 37 which fits into the lower portion 33 of sleeve 14. The assembly fixture 10, which is portable in nature, is illustrated as being supported on a table 38.

A fastening and sizing assembly or mechanism 39 is movably positioned above fixture 10 and may be lowered and raised relative to the fixture by any suitable means (not shown), such as by a hydraulic cylinder. Mechanism 39 comprises a centrally disposed vertically extending shaft 40 having a fastening and sizing pin 41 formed at its lower end. Outer surface 42 of pin 41 is accurately dimensioned to the desired diameter size of the inner surface or bore 43 of the finished bearing 11a (the bearing being hereinafter described in detail). The upper portion of pin 41 is provided with a curved or riveting surface 44, the purpose of which will become more apparent as the description proceeds. Another assembly or mechanism 45, employed for aligning and holding the end shield in position during assembly, is independently movable relative to the mechanism 39 by any suitable means (not shown) and comprises a pair of squaring arms 46 and 47, which are spaced apart on a supporting bar 48 and are biased downwardly in any suitable fashion, such as by resilient cylinder 49. The aligning mechanism 45 cooperates with the fastening and sizing mechanism 39 to align the end shield 12 with bearing blank 11 and to remove the sizing pin 41 from the bore of the finished bearing 11a. An aperture 50 may be provided centrally of bar 48 and shaft 40 may project though aperture 50 in slidable engagement therewith. The significance of the various components of the afore-described novel apparatus will become more apparent as the description proceeds.

Turning now to the bearing blank 11 which may be conveniently formed and assembled onto end shield 12 by the present invention, the blank may be composed of any suitable material, such as bronze, and in its unfinished form, has an inner surface defining a bore 51 which need not be accurately dimensioned within small tolerance limits. In addition, the bearing blank 11 is formed with an outer diameter of reduced size 52 at one of its ends. End shield 12 is shown as being bell-shaped, suitable for use, for example, in totally enclosed motors, as shown in FIG. 5. The end shield has an aperture or hole 53, centrally located and adapted to receive the reduced end portion 52 of the bearing blank 11.

Now, the improved method and operation of the apparatus of FIGS. 1–3 inclusive will be described. Bearing blank 11 is initially placed in recess 30 of collet portion 26 of the fixture 10, in loose engagement thereto, with its end portion 52, of reduced outer diameter, facing upwardly. Mechanisms 39 and 45 are in their upper or raised position, as is sleeve 14. The end shield is thereafter arranged over the fixture 10, with the reduced end portion 52 of the bearing blank extending through end shield aperture 53. It should be noted that at this point, the bore 51 of bearing blank 11 is in substantial, axial alignment with sizing pin 41. Mechanism 45 is lowered until the lower ends 54 and 55 of arms 46 and 47 respectively press with equal force at spaced apart points 56 and 57 on the outer surface of end shield 12 (see FIG. 2), thereby squaring or axially aligning the end shield 12 with bearing blank 11. Mechanism 39 is also lowered so that sizing pin 41 enters bearing blank bore 51. The movement of mechanism 39 is continued after pin 41 enters the bore until riveting portion 44 contacts the upper end 58 of the bearing blank 11, which extends through the end shield 12. This action forces sleeve 14 downwardly, and with it, bearing blank 11. Springs 36, which are cooperatively connected with sleeve 14, are caused to become compressed, thereby storing energy. At the same time, due to the sliding and engaging cooperation between the incline walls 19 and 28 of the respective housing member and collet portion, the three sections 27 of the collet are forced tightly against the outer surface of the bearing blank 11 held therein. Thus, it can be seen that the bearing blank is compressed between the sizing pin 41 and walls 29 of the collet 26, and the blank is held, in effect, stationary within the collet recess, being forced into a finished bearing having an accurately dimensioned bore surface. Moreover, the curved or riveting portion 44 of the pin turns the upper end 58 of the bearing blank downwardly and rivets it firmly against the outer surface 59 of the end shield, thereby providing an especially strong mounting.

With bearing 11a properly sized and rigidly secured to the end shield, sizing pin 41 is then removed from the bearing. To remove the sizing pin, shaft 40 is raised while the arms 46 and 47 respectively still press downwardly on the outer surface of the end shield. Thus, it can be seen that since collet portion 26 still firmly holds finished bearing 11a, the raising of sizing pin 41 has the additional effect of wiping or burnishing the bore 43 of bearing 11a, thereby insuring a proper and smooth journal surface throughout its entire length. Due to the fact that the resilient members 49 have greater biasing strength than does device 32, the sleeve 14 will not move upwardly until after the arms 46 and 47 also have been raised out of contact with the end shield; however, once mechanism 45 has been raised, device 32 with its springs in the compressed position, pushes the sleeve 14 upwardly. The outer walls of collet portion 26, due to the internal resilience thereof, follow the contour of the upper housing walls 19 in sliding engagement therewith, thereby allowing the collet sections 27 to separate to release the bearing held therein. Therefore, an end shield assembly 60 is formed in which sleeve bearing 11a is permanently secured thereto. Assembly 60 may be removed from the fixture 10 merely by lifting it therefrom, without the need for additional force and, thus, the proper bore size, provided during the prior steps, is not adversely affected in any way. The assembled end shield assembly 60 is illustrated in FIG. 4, after its removal from the fixture.

FIG. 5 shows a pair of end shield assemblies, assembled by the improved method, as used in an electric motor 61 of the totally enclosed type in common use today. The end shield assemblies, as employed in this or other machines, provide a machine with an improved operating performance due to the advantageous bearing characteristics.

It will be readily apparent from the foregoing that the present invention produces an end shield assembly in which a bearing is accurately positioned and fixedly secured to the end shield, with a minimum of variation between end shield assemblies. With proper motor assembly techniques, these end shield assemblies may be used to give superior alignment between the bearings and the rotor shaft in the assembled motor, enhancing machine performance. In addition, a bearing blank may be used in which a minimum amount of machining is required, since the various dimensional tolerances are not especially critical due to the fact that the assembly apparatus absorbs the tolerance differences. Moreover, the inner diameter or bore surface of the finished bearing is automatically sized and burnished to an accurate dimension throughout its length for rotatably carrying the rotor shaft with a minimum of interference therewith. Furthermore, since the bearing is released from the assembly fixture without the use of any force at its inner end, it is insured that the bearing will retain the accurately dimensioned bore surface provided during prior assembly steps. In addition, the bearing may now be satisfactorily supported in a fixed and rigid manner without the use of expensive and complex bearing mounts.

FIGS. 6–8 inclusve illustrate a second embodiment of the present invention. As shown therein, the improved apparatus includes a fixture or holding assembly 70 and a bearing fastening and sizing assembly or mechanism 71, movably disposed above (as viewed in the drawings) fixture 70 in a predetermined fashion. Fixture 70 comprises a stationary cast housing 72, formed at its base with a flange portion 73 for mounting the fixture to a stationary frame or table, identified at 74, by any conventional means; e.g., bolts 75. A central bore 76 is provided in housing 72, extending from upper wall 77 of the housing to a lower chamber 78 provided at the bottom portion of housing 72. At its upper entrance, bore 76 is constructed with an enlarged frusto-conical shaped inclined wall 79 which becomes larger in diameter as it approaches the upper housing wall 77.

A sleeve member 80 is slidably received in housing bore 76 and, as in the embodiment of FIGS. 1–3 inclusive, is furnished with a split collet portion 81, consisting of a plurality of spaced apart resilient sections, biased away from the center of the sleeve and integrally joined at their inner ends. The sections of collet portion 81 have inner walls 82 which define a substantially cylindrical surface having a countersunk entrance, as shown at 83. The outer walls 84 of the collet are of sloped configuration of sliding cooperative engagement with the inclined wall 79 of housing 72. Preferably, in its raised or expended (unoperated) position, as shown in FIG. 6, the upper end of collet portion 81 extends axially above housing wall 77. The extreme bottom of sleeve member 80 is formed with an integral flange 85 projecting inwardly to support a central tube 86 within sleeve 80, the tube extending up to collet portion 81 of the sleeve. The upper end of tube 86 and the inner axial walls 82 of split collet portion 81 define a bearing accommodating recess 87. Thus, it will be seen that sleeve 80 and tube 86 are capable of axial movement as a unit within housing bore 76. The bottom of sleeve 80 is provided with means for moving sleeve 80 and tube 86 in either axial direction with a predetermined force. The illustrated means is a conventional type hydraulic cylinder 88 having a piston 89 for driving a piston rod 90 which in turn is fixedly connected, as by a threaded construction generally identified by reference numeral 91, to the lower end of sleeve 80. If desired, a set screw 92 may be used to insure a firm connection between the piston rod and sleeve 80.

The bearing fastening and sizing mechanism 71 in the second embodiment is, in effect, a vertical disposed shaft (as viewed in the drawings) capable of being lowered and raised relative to fixture 70 by any conventional means; e.g. a hydraulic cylinder (not shown). The lower end of mechanism 71 is a sizing pin 93 preferably having an axial length slightly greater than the length of the bearing bore to be formed and having an outer surface accurately dimensioned to the desired bearing bore size. In addition, directly above pin 93, mechanism 71 is furnished with a curved pressure applying surface 94 and a straight surface 95, substantially perpendicular to the axis of pin 93.

In order to illustrate the way the apparatus of FIGS. 6–8 inclusive operates, it is shown forming a sleeve type bearing from a relatively inexpensive sintered type bearing blank 96, substantially cylindrical in shape, having an unfinished bore 97 and assembling the bearing blank onto a relatively small stamped-out end shield member 98 of sheet material of the type generally used in fractional horsepower motors. As illustrated, bearing blank 96 is of the molded porous powdered sintered variety, composed of any suitable bearing material, such as ninety parts copper, ten parts tin and one part graphite. The porosity of the blank is such that capillary passages are provided radially through the body of the blank, from its outer circumferential surface to bore 97.

Referring now to the operation of the apparatus of the second embodiment, FIG. 6 shows the individual components of the apparatus in their unoperated or raised positions. Bearing blank 96 is initially placed in collet recess 87, blank bore 97 being in coaxial relation with pin 93. It should be noted that blank 96 is loosely received by collet portion 81 and has its upper end 99 projecting beyond the countersunk entrance 83 of collet recess 87. End shield member 98 is then arranged over the bearing blank with the extreme end 99 of blank 96 extending through a suitable bearing receiving hole 100 provided centrally of end shield member 98. Preferably, hole 100 is greater in diameter than the outer circumferential surface diameter of bearing blank end 99 by a small amount. For relatively small end shields such as that shown, the end shield and bearing blanks may be conveniently aligned by making the extreme end of the collet substantially perpendicular with respect to the axis of pin 93 and of sufficient radial width to support the end shield in the desired relation relative to bearing blank 96 without the use of other aligning and holding means. For larger sized and shields; e.g., the type used on small horsepower motors, an end shield aligning and holding assembly, such as mechanism 45 previously described for the first embodiment, may be advantageously employed.

Mechanism 71 is lowered relative to fixture 70 so that sizing pin 93 enters blank bore 97, and surface 94 contacts the entrance of the bore, forcing sleeve 80, tube 86, and blank 96 to move downward in housing 72. Consequently, as the split collet portion 81 slides along inclined housing wall 79, the individual collet sections will be forced into tight engagement with the outer surface of blank 96, compressing the blank between the collet and pin 93. Continued downward movement of mechanism 71 causes shaft surface 95 to produce a thrust receiving face 101 (FIG. 7) substantially perpendicular to the longitudinal axis of bearing bore 97 while shaft surface 94 forms a recess 102 (see FIG. 7) for carrying a bead of lubricant adjacent thrust receiving face 101. In addition, the shaft surfaces 94 and 95 cooperate with the collet to fasten blank end 99 to the end shield. More specifically, due to the inherent ductility of the sintered bearing blank, a shoulder will be provided in firm engagement with each side of the end shield, adjacent hole 100, to stake or swedge the blank onto end shield member 98 in a rigid fashion. As seen in FIG. 7, the countersunk entrance 83 of collet portion 81 provides a space for receiving and forming the lower bearing blank shoulder.

At a predetermined point in the downward travel of mechanism 71, for example, just prior to the engagement of surface 94 with blank 96, hydraulic cylinder 88 is actuated by any suitable means, such as the contact of a shoulder 103 provided on mechanism 71 with a microswitch 104 which in turn starts operation of the hydraulic cylinder 88 in the well known way (not shown). Fluid will be transferred into the top section of the cylinder (in the direction of the arrow in FIG. 7), under a predetermined pressure to move piston 89 in a downwardly direction with the desired force. Through the intermediaries of piston rod 90 and attached sleeve 80, collet portion 81 will also be lowered relative to housing wall 79, reducing the cross section area of collet recess 87 until the blank is compressed radially with the desired amount of force between pin 93 of mechanism 71 and collet wall 82. The operated positions or lower limit of travel for both mechanism 71 and the compressed position for the component parts of fixture 70 is illustrated by FIG. 7. Preferably, the actual staking of the bearing blank to the end shield just described is accomplished at some point in time prior to the final compression of the bearing body radially between pin 93 and collet wall 82 achieved by the complete axial displacement of collet 81 reative to housing 72. This squeezing operation controls the size of the capillary passages; i.e., degree of porosity, in the bearing body within very narrow limits to provide the finished bearing with an accurately controlled lubricant rate of flow radially through the bearing body by capillary action. It will be appreciated, of course, that the pressure applied by the fluid to piston 89 determined the ultimate total porosity or lubricant flow rate which will be "built" into the bearing, regardless of the slight variation of porosity existing between individual bearing blanks so that the finished bearings will all have a substantially uniform total porosity.

Once the foregoing manufacturing compression operation has been accomplished, the flow of fluid into hydraulic cylinder 88 may be reversed (as indicated by the direction of the arrows in FIGS. 7 and 8) by any suitable means (not shown) well known in the art. Thus, the fluid in the top section will be removed from cylinder 88 and fluid will enter the bottom cylinder section under pressure, causing piston 89 to move toward the top of the cylinder. This action moves rod 90 and collet portion 81 from the lower compressed position of FIG. 7, attached sleeve 80, in an upward direction to the upper extended or original position shown by FIGS. 6 and 8. Thus, the manufactured end shield assembly, identified at 105 in FIG. 8, which consists of formed bearing 96a and end shield member 98, will be raised along with collet 81. Because the individual sections of collet 81 are resiliently biased away from the center of sleeve 80 and each has an outer wall substantially conforming to the incline of housing wall 79, as sleeve 80 is raised relative to housing 72, the inner wall 82 of the individual collet sections will move away from the outer circumferential surface of the formed bearing to release it from collet recess 87.

Simultaneously with the reverse operation of cylinder 88 described above, mechanism 71 is preferably returned to its original position of FIG. 6 by any suitable means and in so doing sizing pin 93 will carry with it bearing 96a and the end shield assembly 105. In order to remove or strip formed bearing 96a from sizing pin 93, a pair of spaced apart stationary stripping arms 106 are provided, the arms being adapted to straddle the bearing. The lower end of each arm is composed of a small permanent magnet 107, the bottom surfaces 108 of the respective magnets together forming a plane substantially perpendicular to the axis of pin 93. Thus, as mechanism 71 travels upward (broken lines in FIG. 8), magnets 107 contact end shield member 98 and prevent end shield assembly 105 from further upward movement. Continued upward travel of mechanism 71, to the position shown by the solid lines in FIGS. 6 and 8, removes pin 93 from the bore of bearing 96a thereby wiping or burnishing the bore into a smooth finished journal surface. Mechanism 71 may be rotated, if desired, during its descent from the raised position as well as during the burnishing step just outlined. The end shield assembly, temporarily held by magnets 107, may be conveniently removed thereafter from the apparatus without the need for additional forces which would tend to destroy the finished bearing bore provided by the prior manufacturing steps. The apparatus is then ready to form and assemble the next bearing blank and end shield member.

I have found it desirable, when mounting and forming sleeve bearings having relatively short axial lengths as compared with their radial wall thicknesses, to secure the bearing blank firmly to the end shield without an application of a radial compressive force, on the body portion of the blank disposed within the collet recess 87, of sufficient magnitude to produce the finished bearing. For example, I have determined that in forming a sintered bearing having an axial length to wall thickness ratio of 1.5 or less, stresses introduced by the staking step are transmitted axially through the blank body and, in combination with the radial compressive forces required for the final squeezing operation, tend to produce a frusto-conical shaped bore which cannot always be corrected or reformed by subsequent operations.

Consequently, in order to insure the fabrication of a substantially cylindrical journal surface in blanks within the critical length to wall thickness ratio range and using the permeable sintered blank 96 as an exemplification, it is preferable initially to stake blank end 99 to the end shield 98 in a rigid manner and concurrently to produce thrust face 101 by lowering assembly 71 from its raised position shown in FIG. 6 to its operated position illustrated in FIG. 7. During the staking step, with cylinder 88 still in its raised position (seen in FIG. 6) relatively little radial compressive force will be applied by collet 81 to the outer walls of blank 96 due to the position of cylinder 83 which is connected to the collet. Thereafter, the pressure on blank 96 may be relieved, for example, by raising assembly 71 upwardly out of pressure engagement with the extreme end surface of blank 96. This pressure relief may be accomplished satisfactorily by an extremely short movement of assembly 71 in the upward direction, in other words, a slight backing off of the assembly from the staked end of blank 96 while still having the accurately formed peripheral surface of pin 93 extending axially through the blank bore or downwardly beyond the confines of collet recess 87.

Thereafter, with pin 93 projecting beyond the blank bore and with the axial pressure relief of the blank, cylinder 88 may be actuated to lower collet 81 in assembly 105 a predetermined distance to its operated position (FIG. 7) thereby reducing the cross section area of the collet recess 87 and effecting a radial compression of the blank inwardly from collet walls 82 to pin 93 with the preselected force. This action regulates the ultimate size of the capillary passages through the body of the blank to provide a finished bearing with a lubricant rate of flow through the body within the desired range. At the same time, an accurately dimensioned substantially cylindrical journal surface is insured. Once the foregoing procedure has been effected, the remaining manufacturing steps may continue in the same fashion as previously described for the embodiment of FIGS. 6–8 inclusive.

A unitary lubricant reservoir of the type disclosed and claimed in Patent No. 2,959,696 issued to M. D. Tupper and K. M. Feiertag on November 8, 1960 and assigned to the same assignee of the present application, may be mounted over the end of the bearing, which was contained in the collet recess 87. Therefore, the controlled porosity of the formed bearing will be located at the precise location where the lubricant reservoir surrounds the bearing. A pair of end shield assemblies, built in accordance with the foregoing, may be incorporated in an electric motor in a similar manner to that illustrated by FIG. 5 for end shield assemblies produced by the first embodiment.

It will be recognized from the foregoing that the apparatus of the second embodiment has the same inherent advantages as the apparatus of the first embodiment previously outlined. In addition, it is capable of producing a formed bearing having a highly controlled degree of porosity without requiring the employment of expensive equipment.

It should be apparent to those skilled in the art, while I have shown and described what at present is considered to be the preferred embodiments of my invention in accordance with the Patent Statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. The method of forming and assembling a bearing onto an end shield for use in a dynamoelectric machine, said bearing being formed from a blank having a reduced outer surface portion at one end and an inner surface defining a bore, said end shield having an aperture for receiving said reduced portion, said method comprising positioning said bearing blank loosely in an assembly fixture with the reduced portion of said blank extending beyond said fixture and through said end shield aperture; aligning said blank and said end shield while inserting a bearing bore sizing pin into said bore; turning down the end of said reduced portion to stake said bearing blank firmly to said end shield while compressing the portion of said bearing blank in said fixture radially inwardly between said fixture and said sizing pin to form a finished bearing having an accurately dimensioned bearing bore surface; and withdrawing said sizing pin from said bearing bore and discontinuing said compression of the formed bearing in said assembly fixture to facilitate the release of the bearing from said fixture.

2. The method of forming and assembling a sleeve type bearing onto an end shield for use in a dynamoelectric machine, comprising positioning a bearing blank, having an inner surface defining a bore and an outer portion of reduced diameter at one end thereof, loosely within a recess of a fixture assembly with the reduced end portion extending beyond said recess; placing an end shield having an aperture on said fixture with said reduced portion projecting through said aperture; aligning said blank and said end shield while concurrently inserting a bearing sizing pin into said bore; turning down the end of said reduced portion to rivet said bearing blank firmly to said end shield and compressing the portion of said bearing blank in said recess between said fixture and said sizing pin radially inwardly to form a finished bearing having an accurately dimensioned bearing bore surface for the greater part of its axial length; and withdrawing said sizing pin from said bearing bore whereby said bore is wiped and burnished by said pin and loosening said bearing in said recess to release said bearing from said fixture assembly.

3. The method of forming and assembling a sleeve type bearing onto an end shield for use in a dynamoelectric machine, said bearing being formed from a substantially cylindrical blank having an inner surface defining a bore, said end shield having an aperture for receiving one end of said blank, said method comprising positioning said bearing blank in a fixture assembly and with one end of said blank extending beyond said fixture and through said end shield aperture; aligning said blank and said end shield while inserting a bearing bore sizing pin into said bore; applying a generally axial pressure to said one end of the bearing blank to expand said one end radially about the aperture into engagement with the end shield thereby fastening said one end of said blank firmly to said end shield and concurrently compressing the portion of said bearing blank in said fixture radially inwardly around said sizing pin thereby forming a finished bearing having an accurately dimensioned bearing bore surface; and withdrawing said sizing pin from said bearing bore and discontinuing the compression of the formed bearing around said sizing pin.

4. The method of forming and assembling a sleeve type bearing onto a dynamoelectric machine bearing support member composed of sheet material, said bearing being formed from a bearing blank having an unfinished inner bore and first and second portions, said bearing support member having a hole slightly larger than the largest dimension across said first portion, said method comprising: positioning said first portion through said bearing support hole; inserting a bearing forming and sizing pin into said bore; fastening said first portion firmly to said bearing support member by the application of generally axial pressure to said first portion to expand that portion radially about the hole into engagement with the support member while holding said second portion; and compressing said second portion radially inwardly around said forming and sizing pin with a predetermined force applied independently of the pressure applied to said first portion thereby producing a finished bearing having an accurately dimensioned bearing bore throughout the length of said second portion.

5. The method of forming and assembling a porous sintered sleeve type bearing onto an end shield member composed of sheet material, said sintered bearing being formed from a substantially cylindrical bearing blank having an unfinished bore, and first and second end portions, said end shield member having an aperture slightly larger dimensionally across than the diameter of said first end portion, said method comprising: positioning said second end portion of said bearing blank in loose engagement within a holding assembly with said first end portion extending through said end shield aperture; inserting a bearing forming and sizing pin into said bore; fastening said first end portion firmly to said end shield member by the application of generally axial pressure to said first end portion to expand that end portion radially about the aperture into engagement with the end shield member while tightening said holding assembly around said second end portion; compressing said second end portion radially between said sizing pin and said holding assembly with a predetermined force applied independently of the pressure applied to said first end portion to form a bearing having an accurately dimensioned bearing bore and having a controlled porosity within predetermined limits; and discontinuing the compression of said bearing to release said end shield and attached bearing from said holding assembly and withdrawing said forming and sizing pin from said bearing bore.

6. The method of forming and assembling a porous sintered sleeve type bearing onto an end shield member composed of sheet material, said sintered bearing being formed from a substantially cylindrical bearing blank having an unfinished bore, and first and second end portions, said end shield member having an aperture slightly larger dimensionally across than the diameter of said first end portion, said method comprising: positioning said second end portion of said bearing blank in loose engagement within a holding assembly with said first end portion extending through said end shield aperture; inserting a bearing forming and sizing pin into said bore; fastening said first end portion firmly to said end shield member by the application of generally axial pressure to said first end portion to expand that end portion radially about the aperture into engagement with the end shield member while tightening said holding assembly around said second end portion; compressing said second end portion radially between said sizing pin and said holding assembly with a predetermined force applied independently of the pressure applied to said first end portion to form a bearing having an accurately dimensioned bearing bore and having a controlled porosity within predetermined limits; releasing said end shield and attached bearing from said holding assembly; and holding said end shield member while withdrawing said forming and sizing pin from said bearing bore.

7. The method of forming and assembling a porous sintered sleeve type bearing onto an end shield member composed of sheet material, said sintered bearing being formed from a substantially cylindrical bearing blank having an unfinished bore, and first and second end portions, said end shield member having an aperture slightly larger dimensionally across than the diameter of said first end portion, said method comprising: positioning said second end portion of said bearing blank in loose engagement within a holding assembly with said first end portion extending through said end shield aperture; inserting a bearing forming and sizing pin into said bore; fastening said first end portion firmly to said end shield member and forming a thrust receiving surface on the extreme end thereof by the application of generally axial pressure to said first end portion to expand that portion radially about the aperture into engagement with the end shield member while tightening said holding assembly around said second end portion; compressing said second end portion radially between said sizing pin and said holding assembly with a predetermined force applied independently of the pressure applied to said first end portion to form a bearing having an accurately dimensioned bearing bore and having a controlled porosity within predetermined limits; releasing said end shield and attached bearing from said holding assembly; and withdrawing said forming and sizing pin from said bearing bore to burnish said bearing bore into a smooth finished journal surface.

8. The method of forming and assembling a sleeve type bearing onto a support, said bearing being formed from a blank having an inner surface defining a bore, said support having an aperture for receiving a section of said blank, said method comprising the steps of: positioning a first section of said bearing blank in a holding assembly with a second section thereof extending outwardly from said holding assembly and into an aperture in said support; inserting a bearing forming and sizing pin into said bearing bore; applying a generally axial pressure to said second section of said blank to expand said second section radially about the aperture into engagement with said support thereby firmly fastening the blank to said support, compressing said first section of said bearing blank with a generally radial force applied independently of the pressure applied to said second section to form a finished bearing having an accurately dimensioned bearing bore surface, and discontinuing the compression of the formed bearing.

9. The method of forming and assembling a sleeve type bearing onto a support, said bearing being formed from a blank having an inner surface defining a bore, said support having an aperture for receiving an end of said blank, said method comprising the steps of: positioning one end of said bearing blank in a holding assembly, with the other end thereof extending beyond said holding assembly and into an aperture in said support; inserting a bearing forming and sizing pin into said bearing bore applying a generally axial pressure to said other end of said blank to expand said other end about the aperture into engagement with said support thereby firmly fastening the blank to said support, relieving the pressure on said other end, compressing the portion of said bearing blank within the holding assembly with a generally radially applied force around a sizing pin while the pressure is relieved on said other end to form a finished bearing having an accurately dimensioned bearing bore surface, discontinuing the radial compression of the formed bearing, and sizing the bore into a smooth journal surface as the sizing pin is removed from the bore of the formed bearing.

10. The method of forming and assembling a porous sintered sleeve type bearing having an axial length to wall thickness ratio of 1.5 or less onto a support member composed of sheet material, said sintered bearing being formed from a bearing blank including an unfinished bore and a first end portion and a second portion, said support member having a wall formed with an aperture for receiving the first end portion of the bearing blank, said method comprising the steps of: positioning said second portion of said bearing blank in loose engagement within a holding assembly with said first end portion extending into said support aperture; inserting a bearing forming and sizing pin into said bore; applying a generally axial pressure to said first end portion to expand said first end portion radially into firm engagement with said wall forming the aperture, thereby firmly fastening the blank to said support; relieving the pressure on said first end portion; compressing said second portion radially inwardly from said holding assembly around said sizing pin with a predetermined force by reducing the cross section of the collet recess while the pressure is substantially relieved on said first end portion to form said second portion into a bearing having an accurately dimensioned bearing bore and having a controlled porosity within predetermined limits; discontinuing the compression of said bearing, and releasing said support and attached bearing from said holding assembly.

References Cited in the file of this patent
UNITED STATES PATENTS

| | | |
|---|---|---|
| 262,189 | Trageser | Aug. 1, 1882 |
| 1,695,017 | Kuckuck | Dec. 11, 1928 |
| 1,750,290 | Valentine et al. | Mar. 11, 1930 |
| 2,756,495 | Lathrop | July 31, 1956 |